(12) United States Patent
Vanderwees et al.

(10) Patent No.: US 12,545,074 B2
(45) Date of Patent: Feb. 10, 2026

(54) HEAT EXCHANGER WITH ALIGNMENT RIB

(71) Applicant: Dana Canada Corporation, Oakville (CA)

(72) Inventors: Doug Vanderwees, Mississauga (CA); Eric J. Schouten, Hamilton (CA)

(73) Assignee: DANA CANADA CORPORATION, Oakville (CA)

( * ) Notice: Subject to any disclaimer, the term of this patent is extended or adjusted under 35 U.S.C. 154(b) by 247 days.

(21) Appl. No.: 18/184,370

(22) Filed: Mar. 15, 2023

(65) Prior Publication Data

US 2024/0308294 A1 Sep. 19, 2024

(51) Int. Cl.
*B60H 1/00* (2006.01)

(52) U.S. Cl.
CPC ..... *B60H 1/00328* (2013.01); *B60H 1/00271* (2013.01)

(58) Field of Classification Search
CPC .......... B60H 1/00328; B60H 1/00271; H01M 10/6554; H01M 10/625; H01M 10/647; F28D 2021/0029; F28D 1/0308; F28F 2225/04; F28F 2280/04; F28F 3/12
See application file for complete search history.

(56) References Cited

U.S. PATENT DOCUMENTS

| | | | |
|---|---|---|---|
| 2,939,686 A * | 6/1960 | Wildermuth | F28F 3/083 165/167 |
| 6,586,132 B1 * | 7/2003 | Fukuda | H01M 50/209 429/176 |
| 6,962,194 B2 | 11/2005 | Martin et al. | |
| 6,976,531 B2 * | 12/2005 | Martin | F28D 9/0043 165/167 |
| 9,281,547 B2 * | 3/2016 | Maguire | B60L 58/26 |
| 9,897,383 B2 | 2/2018 | Yesin et al. | |
| 10,180,289 B2 * | 1/2019 | Vanderwees | F28F 9/26 |
| 10,317,142 B2 | 6/2019 | Armsden et al. | |
| 2005/0211424 A1 * | 9/2005 | Podhorsky | F28F 3/04 165/152 |
| 2023/0269905 A1 * | 8/2023 | Zborowski | H05K 7/20272 361/689 |
| 2024/0308294 A1 * | 9/2024 | Vanderwees | B60H 1/00328 |

FOREIGN PATENT DOCUMENTS

WO    WO-2011013950 A2 *    2/2011    ..........    F28D 1/0333

* cited by examiner

*Primary Examiner* — Ljiljana V. Ciric
(74) *Attorney, Agent, or Firm* — McCoy Russell LLP (57) ABSTRACT

A heat exchanger in a system and manufacturing method for the heat exchanger. The heat exchanger includes an alignment rib positioned in a stack of plates. The alignment rib includes multiple non-circular in cross-section protrusions that mate with openings in adjoining plates in the stack of plates.

14 Claims, 5 Drawing Sheets

HEAT EXCHANGER WITH ALIGNMENT RIB

TECHNICAL FIELD

The present disclosure relates to a heat exchanger with an alignment rib that aligns a stack of plates.

BACKGROUND AND SUMMARY

Heat exchangers are used in a wide variety of applications to transfer heat away from a component. One particular application of heat exchangers is for power electronics such as power electronics in electric vehicles as well as other systems. Certain previous power electronics heat exchangers have been constructed from multiple layers of plates (e.g., formed or trimmed plates). The inventors have recognized that accurate plate alignment is desirable for mounting electronics devices to the heat exchanger, in certain instances. However, brazing the plates during manufacturing increases the chance of plate misalignment and unwanted plate deformation. Further, it may be desirable to maintain a flat profile of the heat exchanger, in some cases. However, manufacturing techniques that have been used in heat exchanger construction such as staking or swaging will deform the parts, prior to brazing, and affect braze quality and the final part flatness. Further, the use of braze pins may prevent the heat exchanger from achieving tolerance demands in certain applications. Even further, the inventors have recognized that, in some cases, tighter the positional tolerance between core features of the heat exchanger than what previous devices have provided may be desired.

U.S. Pat. No. 6,976,531 B2 to Martin et al. discloses a heat exchanger with stacked plates that each include ridges which intersect one another, when stacked, in an attempt to enhance plate alignment. The ridges are angled and saddle-shaped.

The inventors have recognized several issues with Martin's heat exchanger as well as other previous heat exchangers. The intersecting ridges may not provide a desired amount of alignment under certain loads. Further, the inclined ridges and other structural characteristics of Martin's heat exchanger design increase the vertical thickness of the heat exchanger which may prevent the heat exchanger from being utilized in certain space constrained installation environments.

Other attempts have been made to maintain stack alignment in a heat exchanger via laser tacking which however is capital intensive. Further, laser tacking adds energy to the heat exchanger that melts material which causes molten pools, commonly referred to as weld beads, that have an undesirable effect on the device's surface.

Other heat exchanger manufacturing processes have used techniques such as riveting, braze pins, or joining techniques that do not demand heat in attempts to increase part alignment. When braze pins are used, during the brazing step, the parts expand and the tolerance between the braze pin and the holes in each of the layers allow the layers to shift, causing lower tolerances on features that are specific to each layer. The use of rivets in the heat exchanger increases the device's manufacturing complexity and the riveting forces may be significant enough to cause undesirable part deformation, in some instances.

Facing the abovementioned issues, the inventors developed a heat exchanger to at least partially overcome at least a portion of the issues. The heat exchanger includes, in one example, an alignment rib that is positioned in a stack of plates. In the heat exchanger, the stack of plates includes an inlet port and an outlet port. Further in the heat exchanger, the alignment rib includes multiple non-circular in cross-section protrusions that mate with openings in adjoining plates in the stack of plates. The alignment rib allows the plate stack to maintain desired alignment throughout the manufacturing process. For instance, the mating between the protrusions and the recess may be carried out prior to a brazing step, and the mated interface between the protrusions and the openings decreases the amount of plate deformation during manufacturing prior to brazing. To expound, the abovementioned heat exchanger construction decreases deformation during the fixation process (relative to swaging, etc.) due to the lower fixation forces used for fixation. The lower fixation force demands assist in maintaining the flatness of the final product. By enhancing plate alignment and decreasing plate deformation, the heat exchanger may be more accurately mounted on a device (e.g., a power electronics devices, the electric vehicle use-case), as a result. Consequently, the applicability of the heat exchanger is expanded.

Further, in one example, the non-cylindrical protrusions may be interference fit with the openings in the adjoining plates. In this way, the alignment of the plates in the stack is further enhanced. Still further in one example, each of the protrusions may have multiple alignment edges which are each formed via abutting faces. Specifically, in one example, each protrusion may include two pointed edges that are positioned on opposing sides of the protrusions. Designing the protrusions in this manner further enhances plate alignment. To elaborate, the protrusions with the point contacts allows for fixation to occur with a decreased amount of deformation (e.g., without deformation) due to the lower force used for fixation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A heat exchanger that includes structural features for more accurately aligning a stack of plates during a manufacturing process is described herein. This alignment feature may be particularly useful for aligning the plates prior to a brazing manufacturing step and reduces the amount of plate deformation and misalignment which may occur during fixation (prior to brazing). To elaborate, the decrease in component deformation results from the lower fixation forces demanded for this heat exchanger design when compared to other techniques for securing plates together such as swaging, pins, and the like. Consequently, the heat exchanger is able to achieve tolerance that allows it to be mounted on devices (e.g., power electronics devices) which demand comparatively high tolerances. However, the alignment feature may be implemented in a variety of heat exchangers which may or may not use brazing in their manufacturing process. The enhanced alignment is achieved using an alignment rib with non-cylindrical protrusions that mate (e.g., interference fit) with openings in adjoining plates. For instance, the protrusions may be positioned on the bottom of the rib. In such an example, the bottom protrusions mate with a base plate. Further, in certain heat exchanger designs, the rib additionally includes top protrusions that mate with a top plate. Each of the protrusions may include pointed edges that further enhance alignment. The pointed edges may be positioned on opposing sides of the protrusions and reduce the chance of unwanted deformation and/or movement of the plates in the stack (e.g., the top plate and the base plate).

Figure 1:
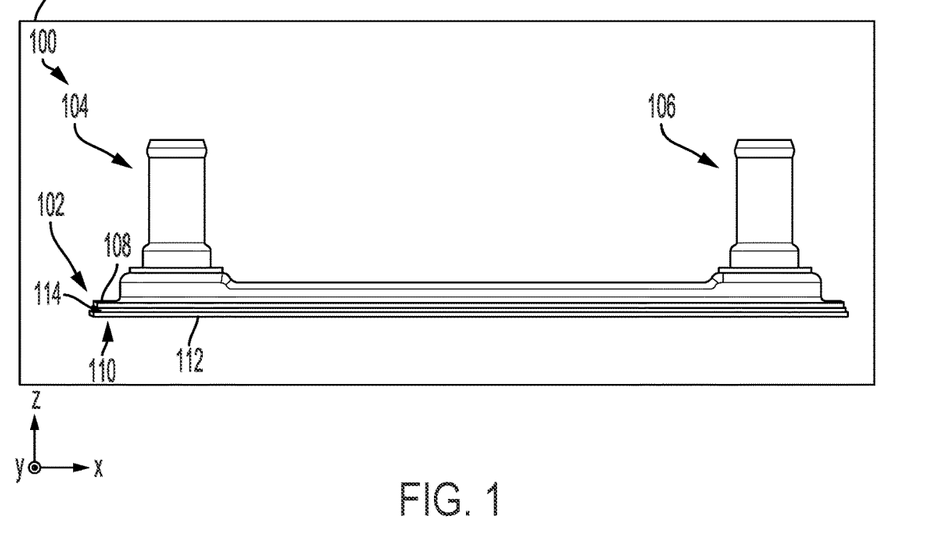
FIG. 1 is a side view of an exemplary heat exchanger.

FIG. 1 shows a heat exchanger 100 that includes a stack of plates 102. The heat exchanger 100 may be included in a system 103, such as a power electronics system of an electric vehicle (EV). For instance, the heat exchanger 100 may be coupled to a traction battery or an inverter in an EV. In such an example, the heat exchanger may be a power electronics heat exchanger. However, it will be understood that the heat exchanger may be used in a variety of systems and other types of vehicles.

The heat exchanger 100 further includes ports 104 and 106. The ports are illustrated as fittings in the illustrated example. However, in other examples, the ports may take the form of openings or other suitable fluid interfaces. The port 104 may be an inlet port and the port 106 may be an outlet port or vice versa. The ports allow a fluid (e.g., a coolant) to be directed into and out of the heat exchanger. The ports 104 and 106 may be removably coupled to or included in a top plate 108 (e.g., core plate) in the stack of plates 102, in the illustrated example. However, the ports may be positioned in another suitable location in the heat exchanger, in other examples, such as in a base plate 110. Further, in the illustrated example, the base plate 110 includes a planar outer surface 112. The plate stack further includes a shim plate 114, in the illustrated example. However, other plate stack arrangements have been contemplated. For instance, the shim plate may be omitted in other examples, or the stack may include multiple shim plates, in different examples.

An axis system is provided in FIG. 1 as well as FIGS. 2-11, for reference. The z-axis may be a vertical axis, the x-axis may be a longitudinal axis, and/or the y-axis may be a lateral axis (e.g., horizontal axis), in one example. It will be appreciated that the vertical axis may be parallel to a gravitational axis. However, the heat exchanger may be placed at a variety of orientations. Further, the axes may have other orientations, in other examples.

Figure 2:
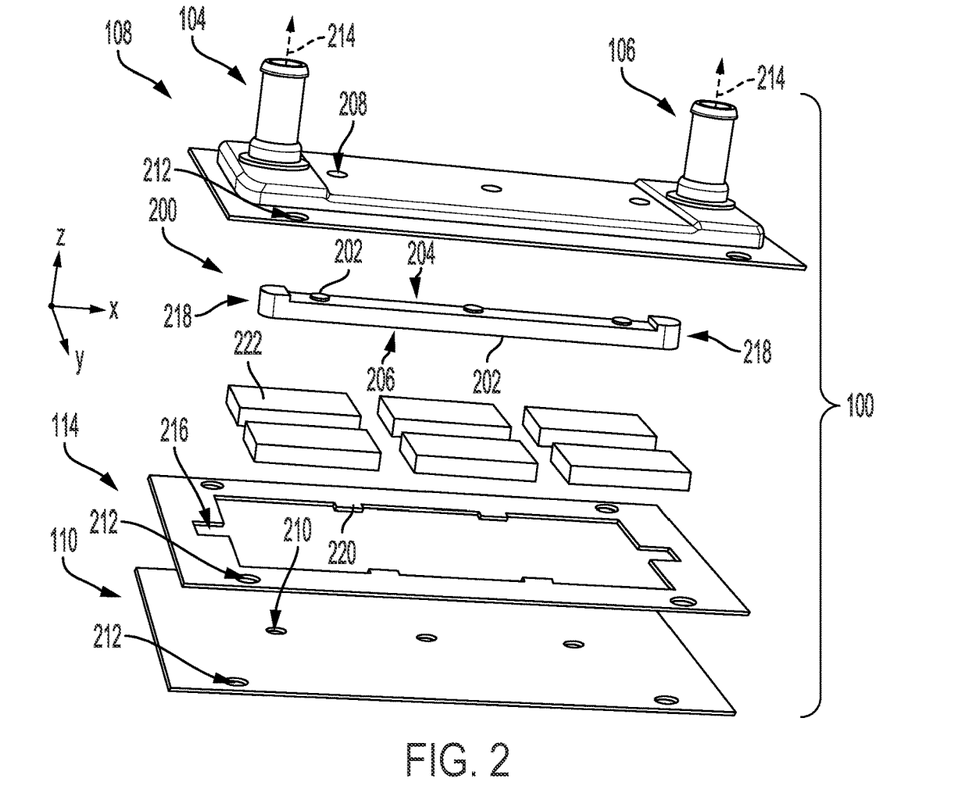
FIG. 2 is an exploded view of the heat exchanger, depicted in FIG. 1.

FIG. 2 shows an exploded view of the heat exchanger 100. The stack of plates 102 is again illustrated along with an alignment rib 200 (e.g., a centering rib). The alignment rib 200 includes multiple non-cylindrical alignment protrusions 202. In the illustrated example, the non-cylindrical protrusions 202 are arranged on an upper side 204 and a lower side 206 of the alignment rib 200. Placing the non-cylindrical protrusions 202 on the top and the bottom of the alignment rib 200 allows alignment between the rib and plates above and below the rib to be enhanced. However, in alternate examples, the protrusions may be included solely on the top side or the bottom side of the rib. In the illustrated example, the non-cylindrical protrusions 202 have identical shapes which may simplify manufacturing. However, in other examples, the size of at least a portion of the protrusions may vary from protrusion to protrusion.

The alignment rib 200 is longitudinally aligned (with regard to the x-axis) in the illustrated example. The longitudinal alignment of the alignment rib 200 allows the rib to be space efficiently incorporated into the plate stack with a diminished amount of fluid flow interference. Further, longitudinally positioning the alignment ribs may further allow the number of ribs used in the heat exchanger to be decreased. For instance, heat exchanger designs where the alignment rib is laterally aligned may demand the use of more than one rib. However, heat exchangers with one or more laterally aligned ribs have been contemplated which may however decrease alignment precision.

The stack of plates 102, in the illustrated example, includes the base plate 110, the top plate 108, and the shim plate 114 which is positioned vertically between the top plate and the base plate. However, other plate stack configurations have been contemplated. For instance, heat exchanger designs without a shim plate or more than one shim plate may be used, in other examples. Further, in other examples, dimple plates or other heat transfer enhancements may be used in the plate stack.

The top plate 108 includes openings 208 that are sized to mate with the non-cylindrical protrusions 202 on the top of the alignment rib 200. Conversely, the base plate 110 includes openings 210 that are sized to mate with the non-cylindrical protrusions 202 on the bottom of the alignment rib 200. The openings in the plates and the rib protrusion may specifically be press fit together. To elaborate, the nominal diameter of the circular portion of the protrusions may be less than the diameter of the openings, which gives flexibility for plates in the stack to be aligned both longitudinally and laterally prior to fixation. There may be an interference fit solely between the pointed edges of the protrusions and the edges of the openings, which allows for a decreased amount of force for fixation to be used, if desired.

Further, in the illustrated example, the top plate 108, base plate 110, and shim plate 114 include mounting openings 212 that are positioned in peripheral areas of each plate such that they are aligned with one another when the stack is formed during assembly. In this way, the heat exchanger may be efficiently attached to a desired component.

The top plate 108 further includes the ports 104 and 106. The ports 104 and 106 are vertically aligned, in the illustrated example. Specifically, central axes 214 of the ports are parallel to a vertical axis (z-axis). However, other port orientations are possible. For instance, the ports may be angled with regard to the vertical axis and/or included in another plate in the stack. A fluid (e.g., oil, glycol, and/or water) is flowed through the ports during heat exchanger operation. As such, the heat exchanger may be in fluidic communication with a fluid pump.

The shim plate 114, in the illustrated example, includes slits 216 that mate with longitudinal ends 218 of the alignment rib 200, when the heat exchanger 100 is assembled. However, in other examples, the slits may be omitted from the shim plate.

In the illustrated example, the shim plate 114 further includes extensions 220 that function to align heat transfer enhancements 222 (e.g., turbulators and/or fins) in a desired position. However, the shim plate may have other contours in alternate designs.

Figure 3:
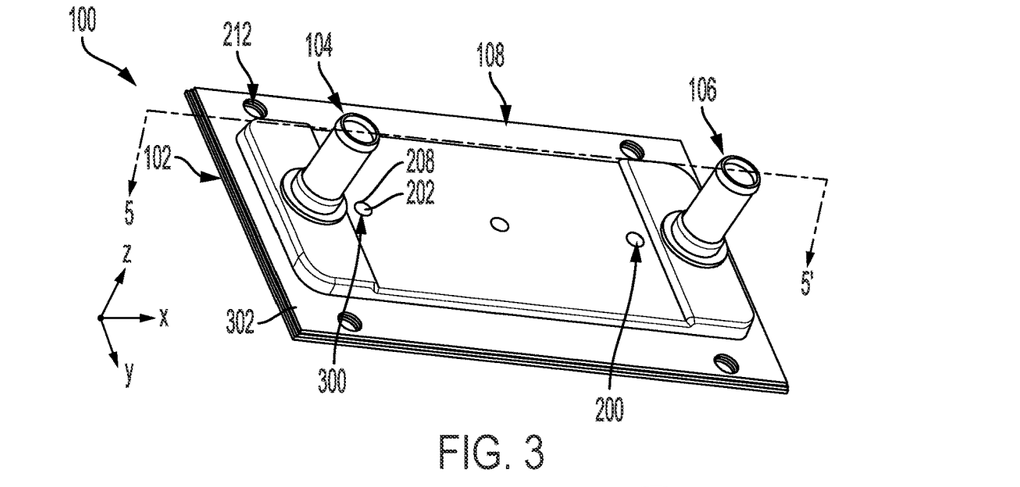
FIGS. 3 and 4 are top and bottom perspective views, respectively, of the heat exchanger, depicted in FIG. 1.

FIG. 3 shows an assembled perspective view of the heat exchanger 100. The mated interfaces 300 between the non-cylindrical protrusions 202 and the openings 208 in the top plate 108 is depicted. The mated interfaces 300 may specifically be interference fit interfaces where the sizing of the mated components is selected to form a joint that is frictionally held together. In this way, the strength of the connection between the rib and the plates is further increased. Further the mounting openings 212 are shown extending through the stack of plates 102 which allows the heat exchanger to be efficiently installed. Further, the ports 104 and 106 are again illustrated in FIG. 3. The mounting openings 212 are further illustrated in FIG. 3. The mounting openings 212 are included in peripheral sections 302 of the plates in the stack 102. However, other mounting opening layouts may be used or the mounting openings may be omitted, in alternate examples. Cutting plane 5-5' denotes the cross-sectional view depicted in FIG. 5.

Figure 4:
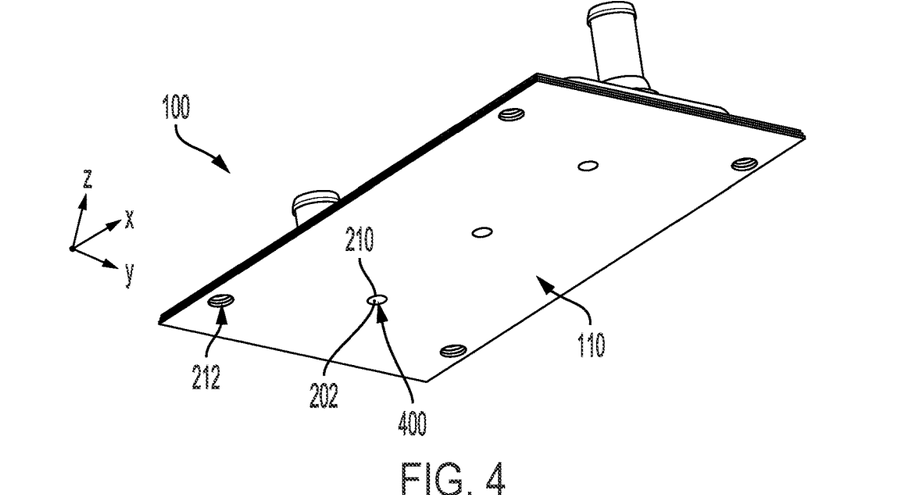

FIG. 4 shows a bottom perspective view of the heat exchanger 100. The non-cylindrical protrusions 202 on the bottom side of the alignment rib 200 which form mated interfaces 400 with the openings 210 in the base plate 110 of the plate stack. The mounting openings 212 are further illustrated in FIG. 4. Again, the mated interfaces 400 may specifically be interference fit interfaces.

Figure 5:
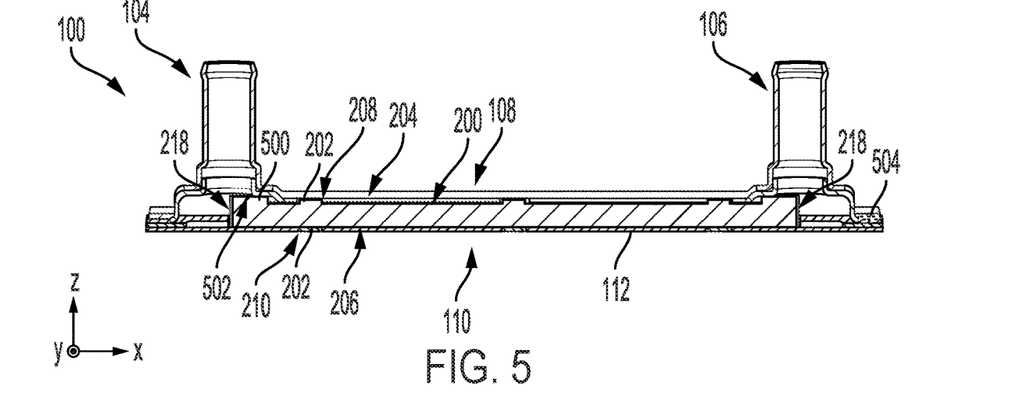
FIG. 5 is a cross-sectional view of the heat exchanger, depicted in FIG. 1.

FIG. 5 shows a cross-sectional view of the heat exchanger 100. The non-cylindrical protrusions 202 in the upper side 204 of the alignment rib 200 are shown mating with the openings 208 in the top plate 108. Likewise, the non-cylindrical protrusions 202 in the lower side 206 of the alignment rib 200 are shown mating with the openings 210 in the base plate 110. However, as previously discussed, the rib may include protrusions solely on the top side or the bottom side of the rib. The mated interface between the protrusions and the openings in the plates enhances alignment of the plate stack and decreasing component deformation that occurs during component fixation. Consequently, undesirable variances in manufacturing which may stem from one or more manufacturing steps can be reduced.

Further, as illustrated in FIG. 5, the alignment rib 200 includes raised sections 500 (e.g., collars) at opposing longitudinal ends 218 of the rib. The raised sections 500 mate with recesses 502 in the top plate 108. In this way, alignment between the alignment rib 200 and the top plate 108 is further enhanced. However, in other examples, the raised sections may be omitted from the centering rib. The non-cylindrical protrusions 202 may be positioned longitudinally between the ports 104 and 106 which may allow the compression force exerted on the plate stack during interference fitting to be applied in a desired area that is less likely to undesirably deform when the rib and plates are coupled via press-fitting.

The heat exchanger described herein may be constructed by first assembling the plate stack and the rib. During assembly of the plate stack and the rib, the rib protrusions are aligned with the plate openings. Next, the plates and the rib may be interference fit. Subsequently, in the manufacturing process, plates in the stack may be brazed such that brazed interfaces are formed between adjacent plates. The features of the heat exchanger that enhance alignment, such as the interface between the rib protrusions and the plate openings, allow the chance of misalignment and/or deformation of the stack of plates which may occur during fixation (prior to brazing) to be reduced. To elaborate, the reduction in deformation of the components may be linked to the diminished forces used for press-fitting the rib and the plates when compared to other techniques used for precisely fixing the parts together prior to brazing. As such, a manufacturing method may be implemented to form the heat exchanger using the aforementioned steps, in one exemplary manufacturing scenario.

Examples of the brazed interfaces 504 are further depicted in FIG. 5. The brazed interface is shown in solely a portion of the heat exchanger. However, it will be understood that brazed interfaces may be formed at the majority (e.g., all) of the contact points between the various heat exchanger components, in one example.

FIG. 5 further shows the planar outer surface 112 of the base plate 110 which allows the heat exchanger to be accurately mounted to devices such as power electronics devices when the heat exchanger is used in an electric drive unit of an electric vehicle, in one use-case example.

The non-cylindrical protrusions 202 do not extend below or above the base and top plates 108 and 110, in the illustrated example. In this way, the plates may maintain flat outer surfaces to allow the heat exchanger to be efficiently mounted to a device. However, in other examples, at least the protrusions on the upper side of the rib may extend beyond the outer surface of the top plate.

Figure 6:
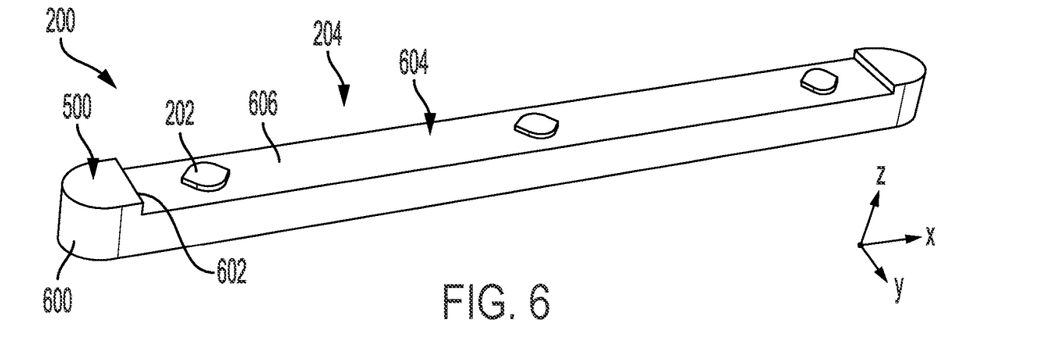
FIGS. 6-10 are detailed views of an alignment rib in the heat exchanger, depicted in FIG. 1.
Figure 7:
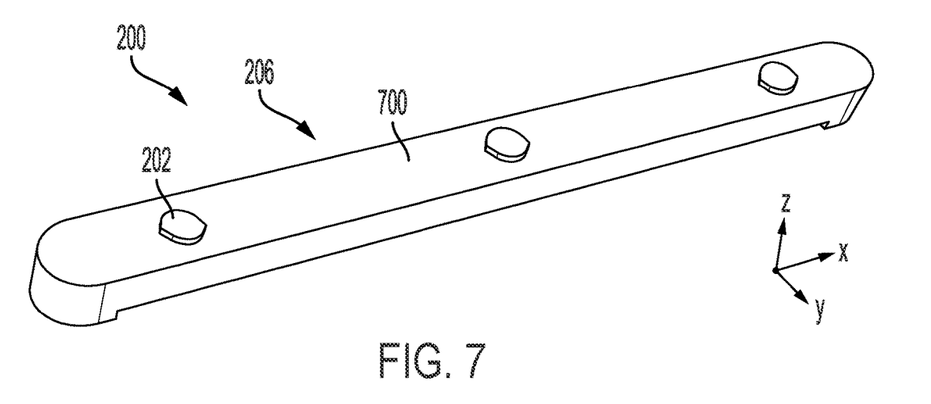

FIGS. 6 and 7 show a top view and a bottom view, respectively, of the alignment rib 200 with the non-cylindrical protrusions 202. The non-cylindrical protrusions 202 may have a symmetric spacing along the longitudinal axis (x-axis). However, non-symmetric protrusion layouts have been contemplated.

FIG. 6 specifically shows the upper side 204 of the alignment rib 200 with the non-cylindrical protrusions 202. The raised sections 500 of the alignment rib 200 is further shown in FIG. 6. The raised sections 500 may include a curved outboard surface 600 and a planar inboard surface 602. However, other raised section contours have been contemplated. Further, the raised sections 500 extend from a body 604 of the rib which may have a flat surface 606. However, as indicated above, the raised sections 500 may be omitted from the rib in other examples.

FIG. 7 shows the lower side 206 of the alignment rib 200 with the non-cylindrical protrusions 202. The lower side 206 has a planar surface 700 from which the non-cylindrical protrusions 202 extend, in the illustrated example. However, other rib contours have been envisioned.

Figure 8:
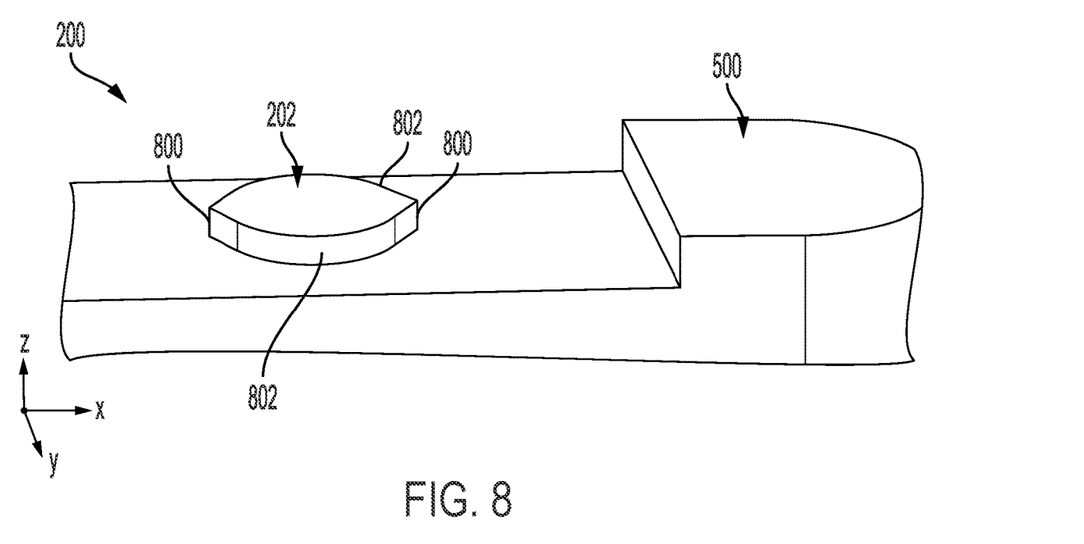
Figure 9:
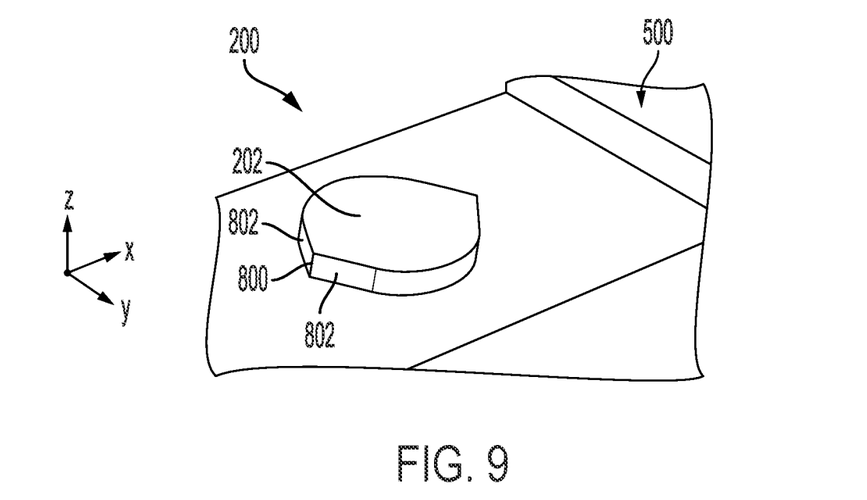

FIGS. 8 and 9 show detailed views of one of the non-cylindrical protrusions 202 and one of the raised sections 500 in the alignment rib 200. The protrusion 202 may include alignment edges (e.g., pointed edges) 800 which are formed by abutting faces 802. To elaborate, the alignment edges 800 may be formed via two intersecting radii that form a spike like shape that emanate from the collar of the rib. These intersecting radii may be formed by a cutter during machining of the rib. Designing the protrusions with the alignment edges allows the alignment between the plates and the rib to be further enhanced and allows the parts to maintain a desired position during downstream manufacturing steps such as brazing, for instance. The alignment edges allow the pressure demanded to press the rib and plates together to be decreased. Consequently, the flatness of the plates may not be significantly influenced when the parts are pressed together.

Figure 10:
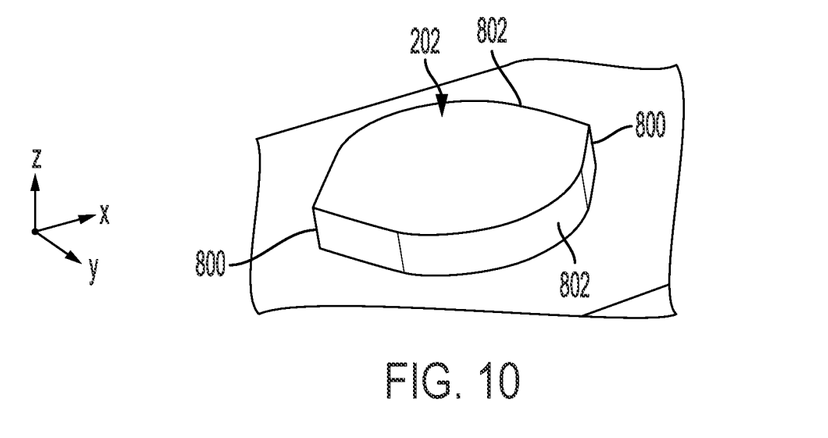

FIG. 10 shows another detailed view of one of the non-cylindrical protrusions 202 with the alignment edges 800 that are formed via abutting surfaces 802. As indicated above, the alignment edges facilitate enhanced plate alignment for further processing during heat exchanger manufacturing. The non-cylindrical protrusions 202 and specifically the edges 800 may be formed using a cutter during machining of the alignment rib (e.g., machining of the raised sections 500, shown in FIG. 9). This protrusion geometry may be desirable, in certain cases, since the force demanded for press fitting the rib with the plates is comparatively small due to the tip of the machined edges and the plate openings solely being deformed. This comparatively low pressure demanded for interference fitting the rib and the plates does not significantly influence the flatness of either part, but provides the locking feature which aids in alignment of the parts and holds the parts together for further processing.

Figure 11:
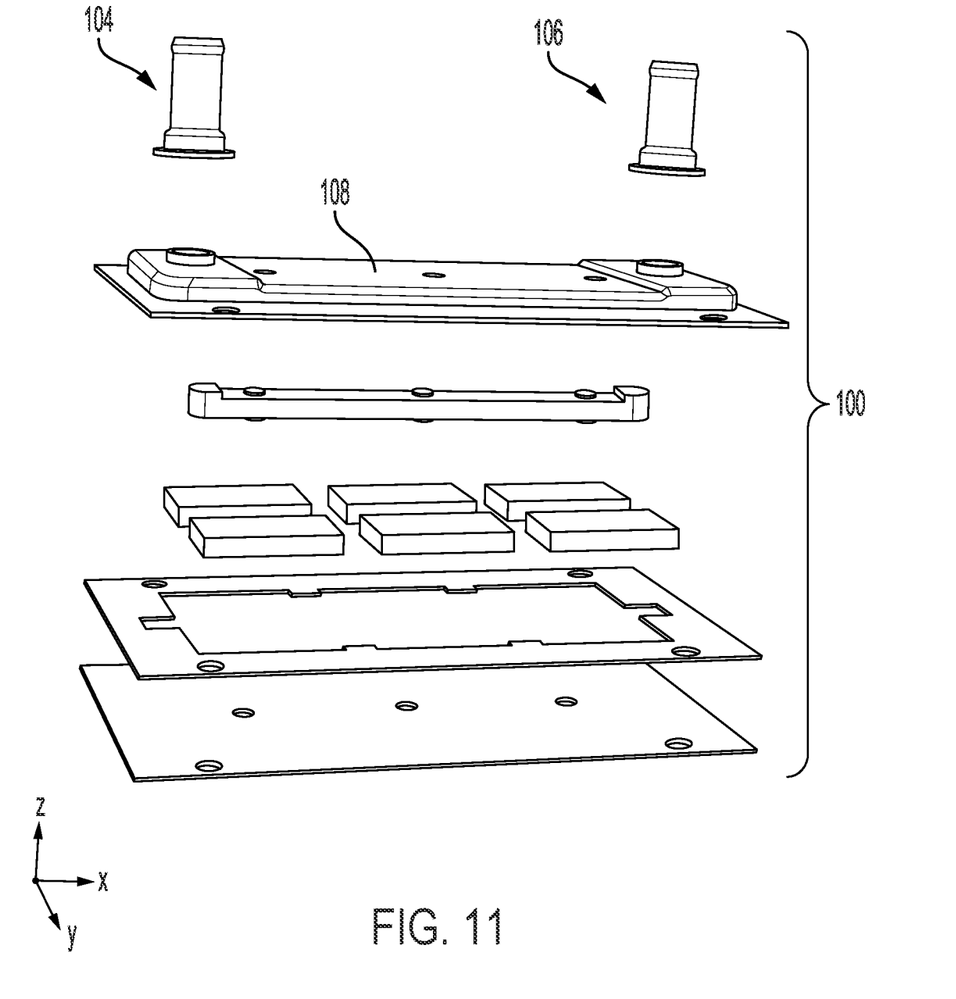
FIG. 11 shows another exploded view of the heat exchanger, depicted in FIG. 1.

FIG. 11 shows an exploded view of the heat exchanger 100 with the ports 104 and 106 which are removably coupled to the top plate 108. However, as indicated above, other port designs have been envisioned.

FIGS. 1-11 are drawn approximately to scale, aside from the schematically depicted components. However, alternate relative component dimensions may be used, other examples.

FIGS. 1-11 show example component configurations with relative positioning of the various components. If elements are shown directly contacting each other, or directly coupled to one another, then such elements may be referred to as directly contacting or directly coupled to one another, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such. Still further, an axis about which a component rotates may be referred to as a rotational axis.

The invention will be further described in the following paragraphs. In one aspect, a heat exchanger is provided that comprises an alignment rib positioned in a stack of plates; wherein the stack of plates includes an inlet port and an outlet port; and wherein the alignment rib includes multiple non-cylindrical protrusions that mate with openings in adjoining plates in the stack of plates.

In another aspect, a power electronics heat exchanger is provided that comprises an alignment rib included in a stack of plates; wherein the alignment rib includes multiple non-cylindrical protrusions that interference fit with openings in a base plate and/or a top plate in the stack of plates; and wherein each of the plates in the stack of plates are coupled to adjacent plates via brazed interfaces.

In any of the aspects or combinations of the aspects, the mated interface formed between the non-cylindrical protrusions and the plate openings may form interference fit interfaces.

In any of the aspects or combinations of the aspects, the stack of plates may include a base plate and a top plate with the inlet port and the outlet port.

In any of the aspects or combinations of the aspects, the base plate may include a planar outer surface.

In any of the aspects or combinations of the aspects, the stack of plates may include a shim plate which is positioned vertically between the top plate and the base plate.

In any of the aspects or combinations of the aspects, the multiple non-cylindrical protrusions may be positioned on an upper side and a lower side of the alignment rib.

In any of the aspects or combinations of the aspects, the non-cylindrical protrusions on the upper side of the alignment rib may be vertically aligned with the non-cylindrical protrusions on the lower side of the alignment rib.

In any of the aspects or combinations of the aspects, each of the non-cylindrical protrusions may have an identical shape.

In any of the aspects or combinations of the aspects, each of the non-cylindrical protrusions may have multiple alignment edges which are each formed via abutting faces.

In any of the aspects or combinations of the aspects, the multiple alignment edges may be positioned on opposing sides of the non-cylindrical protrusions.

In any of the aspects or combinations of the aspects, the alignment rib may be positioned longitudinally between an inlet port and an outlet port.

In any of the aspects or combinations of the aspects, the alignment rib may have a constant thickness from a first end to a second end.

In any of the aspects or combinations of the aspects, the heat exchanger may be included in a vehicle power electronics system.

In any of the aspects or combinations of the aspects, the base plate may include a flat outer surface.

In any of the aspects or combinations of the aspects, the alignment rib may be positioned longitudinally between axially extending fluid ports.

In any of the aspects or combinations of the aspects, the top plate and the base plate may include multiple mounting openings in peripheral surfaces.

In any of the aspects or combinations of the aspects, the multiple non-cylindrical protrusions may be identical in shape.

In any of the aspects or combinations of the aspects, each of the multiple non-cylindrical protrusions may include pointed edges positioned on opposing sides of the protrusion.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to vehicles that include different types of propulsion sources including different types of traction motors, internal combustion engines in some instances, transmissions, and the like. The above technology can also be applied to other systems with component cooling needs. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A heat exchanger, comprising:
an alignment rib positioned in a stack of plates;
wherein the stack of plates includes an inlet port and an outlet port; and
wherein the alignment rib includes multiple non-circular in cross-section protrusions that mate with openings in adjoining plates in the stack of plates.

2. The heat exchanger of claim 1, wherein the mated interface formed between the multiple non-circular in cross-section protrusions and the openings in the adjoining plates form interference fit interfaces.

3. The heat exchanger of claim 1, wherein each of the plates in the stack of plates are coupled to adjacent plates via brazed interfaces.

4. The heat exchanger of claim 1, wherein the stack of plates includes a base plate and a top plate with the inlet port and the outlet port.

5. The heat exchanger of claim 4, wherein the base plate includes a planar outer surface.

6. The heat exchanger of claim 4, wherein the stack of plates includes a shim plate which is positioned vertically between the top plate and the base plate.

7. The heat exchanger of claim 4, wherein the multiple non-circular in cross-section protrusions are positioned on an upper side and a lower side of the alignment rib.

8. The heat exchanger of claim 7, wherein the multiple non-circular in cross-section protrusions on the upper side of the alignment rib are vertically aligned with the multiple non-circular in cross-section protrusions on the lower side of the alignment rib.

9. The heat exchanger of claim 1, wherein each of the multiple non-circular in cross-section protrusions have an identical shape.

10. The heat exchanger of claim 1, wherein each of the multiple non-circular in cross-section protrusions have multiple alignment edges which are each formed via abutting faces.

11. The heat exchanger of claim 10, wherein the multiple alignment edges are positioned on opposing sides of the non-circular in cross-section protrusions.

12. The heat exchanger of claim 1, wherein the alignment rib is positioned longitudinally between the inlet port and the outlet port.

13. The heat exchanger of claim 1, wherein the alignment rib has a constant thickness from a first end to a second end.

14. The heat exchanger of claim 1, wherein the heat exchanger is included in a vehicle power electronics system.

\* \* \* \* \*